United States Patent [19]

Bohg

[11] 4,353,076

[45] Oct. 5, 1982

[54] APPARATUS FOR CONTROLLING A RECORDER

[75] Inventor: Armin Bohg, Weil im Schonbuch, Fed. Rep. of Germany

[73] Assignee: International Business Machines Corporation, Armonk, N.Y.

[21] Appl. No.: 138,952

[22] Filed: Apr. 10, 1980

[30] Foreign Application Priority Data

Sep. 4, 1979 [DE] Fed. Rep. of Germany ....... 2935596

[51] Int. Cl.³ .............................................. G01D 9/02
[52] U.S. Cl. ................................................... 346/65
[58] Field of Search .................................. 346/65, 1.1

[56] References Cited

U.S. PATENT DOCUMENTS

| | | | |
|---|---|---|---|
| 1,784,522 | 12/1930 | Harrison | 346/65 X |
| 2,470,745 | 5/1949 | Schlesman | 346/65 X |
| 3,233,245 | 2/1966 | Godby | 346/65 X |
| 3,846,785 | 11/1974 | Rossi | 346/65 X |

*Primary Examiner*—G. Z. Rubinson
*Assistant Examiner*—W. J. Brady
*Attorney, Agent, or Firm*—Bernard N. Wiener; Yen S. Yee

[57] ABSTRACT

A curve plotter or a display device for the recording of a curve section outside of a recording field is equipped with a logic circuit which shifts it into the recording field. Either the curve recording is continued after a margin of the recording field has been reached in the inverse recording direction, or the original recording direction is maintained but the curve recording is continued from the opposite margin of the recording field. Recording of the off-scale curve section can be performed by digital or analog steps and can be marked specifically.

13 Claims, 11 Drawing Figures

APPARATUS FOR CONTROLLING A RECORDER

FIELD OF THE INVENTION

The invention relates to method and apparatus for controlling a recorder by means of a recording control unit in response to measured values to be recorded in curve form in a recording field of a recording medium.

BACKGROUND OF THE INVENTION

Recorders in the form of plotters or two-coordinate display or recording devices are frequently used as level plotters, analog computer or integrator output arrangements. Generally, there is the problematic factor of setting the recording scale which determines the recording precision achievable. Specific steps are not required for recording curves which cannot have any excessive peaks, or for curves where such peaks are not expected. However, the situation is critical if in addition to the expected curve there will be excessive peaks, or even runaways. If the recording scale is set so that practically all curve peaks are recorded with some certainty, the recording precision may be unsatisfactory and important information might be lost. Apart from the loss of data, the cutting off of excessive curve peaks and runaways may not always be advisable since a curve to be recorded may take a true measured value course over a significant distance along the margin of the recording fields, if only with a very small probability. Consequently, it is not obvious that the presented information is genuine.

Heretofore, German Patent DE-OS No. 1,798,042 provided a comparison between the measured value to be registered and a reference value corresponding to the margin of the recording field. Specific electrodes at the ends of the printing arrangement or of the recording element were energized for off-scale excursions of incoming measured values. These electrodes cause response of recording elements for marking the presence of a curve area outside the recording field on the recording medium. Although this procedure permits a clear differentiation between curve areas outside the recording field, and measured value courses along the margins of the recording field, there still is loss of information associated with curve areas outside of the recording field. Therefore, the scale setting for curve recording has to be critically considered so there is no loss of information. There exists measuring devices with maximum and minimum value recording, as shown in German Patent DE-OS No. 2,656,304, comprising counter, measured value comparing unit and storage. However, this device does not include continuous measured value recording of off-scale excursions.

It is known to provide scale factor changes for recording of results supplied by an analog computer automatically, for example, as specified in "Elektronische Analogierechenmaschinen" by G. A. Korn, and T. M. Korn, published by "Berliner Union", Stuttgart 1960, pages 386 and 387. Accordingly, an arithmetic unit can be brought into a "hold condition," either periodically or after predetermined intervals, for reading values of selected machine variables for check, print, recording medium processing, or transmission. During intervals in such procedure, scale factors can be altered, if necessary. That procedure can also be released automatically as soon as selected machine variables either fall short of or exceed predetermined values. Compare circuits are used for operating electronic switching devices which bring the analog computer into the "hold condition" and which alter the scale factor so that the calculation can be initiated with correct scale setting.

If the margins of a recording field are used as reference values, for these predetermined values to be exceeded or not reached, a suitable recording scale ensures either that excessive peaks can be recorded because with a standard curve there is a sufficient scale or that the precision in the recording of curve maxima and minima is accordingly reduced. Hence, information is also lost because of reduced resolution. It is also known, from "Electronic Analog and Hybrid Computers" by G. A. Korn and T. M. Korn, published by McGraw Hill Book Company page 38, that in connection with analog computer output the scale factor is to be determined empirically. According to pages 451 and 452 thereof, signalling lights might be used for indicating an off-scale excursion in curve recording.

The prior art does not present a suitable solution for the problem of off-scale excursions in curve recording and representation.

SUMMARY OF THE INVENTION

It is an object of the invention, without a necessary critical scale selection, to effect curve recording, for example, in analog computer output, measured value output, and data transmission, by two-coordinate display and registration devices so that the information supplied by a measured value emitter is fully maintained, and can be evaluated in a once-established resolution.

It is another object of this invention to achieve the aforesaid object of the invention by a recording control unit in response to measured values ($Y_M$) to be recorded in curve form in a recording field of a recording medium, the recording elements being energized for marking purposes by off-scale excursions of the measured values ($Y_M$), on the basis of comparison results ($Y_{MIN} > Y_M > $ MAX) of the respective measured values ($Y_M$) with reference values ($Y_{MIN}$, $Y_{MAX}$) which are predetermined by the upper and lower margins of the recording field.

It is another object of this invention that the immediately preceeding object be characterized, apart from direct measured value recording known per se for detecting measured values ($Y_{MIN} > Y_M > Y_{MAX}$) within the recording field, the recording control unit, upon indirect recording for detecting measured values ($Y_{MIN} > Y_M > Y_{MAX}$) existing per se outside the recording field, energizes recording elements effective within the recording field for continuing the curve recording with simultaneous marking by means of specific recording element control of the respective curve section extending per se outside the recording field.

The method of the invention is applicable both for plotters with mechanical recording element deflection and for oscillographs and oscilloscopes.

In a mechanical recording by pens, the curve can be recorded both through corresponding deflection of a recording element over the recording width and by series of insulated writing electrodes which are selectively energized by means of electrical writing voltages, as described in German Patent DE-PS No. 1,623,885.

If the method of the invention is performed with a digital computer, a printer can be energized as a function of the measured values to record curves on a paper web.

Consequently, each curve recording or representation is a direct measured value recording as long as there can be no off-scale excursion of the measured values. However, according to the invention, there is an indirect measured value recording if an off-scale excursion of the measured value recorded in the predetermined recording scale can not be avoided.

A curve section shifted into the recording field as a consequence of an off-scale excursion, i.e., an indirect recording, can be marked in various ways. Either specific recording elements can be provided, or a specific recording element control is employed using only one recording element, e.g., a pen, with the marking being effected in such forms as dashes or dot-dashes for the curve section.

Therefore, because of the invention, the information supplied by measured values is fully available or remains fully available, particularly by marking the recorded curve section of an off-scale excursion in the recording field itself. Particularly, in registration procedures executed without continuous control, e.g., during the night, a suitable recording scale can be permanently fixed without there being the risk of valuable information being lost through excessive peaks appearing during periods without supervision.

In a specific embodiment of the invention, a direct dependence of the curve-recorded values on the measured values is maintained in successive periods, but an interval with direct measured value recording is preceded and followed in one case without discontinuity by one respective interval with mirror function, and in the other case with discontinuities by intervals with indirect measured value recording, taking into consideration the addition or subtraction constants connected with the respective discontinuity. In the former case, according to the invention, one respective interval corresponds to a semi-period of a symmetric ramp function oscillation, whereas in the latter case the respective interval between two continuities amounts to one period of an asymmetric ramp function oscillation.

Further, a symmetrical ramp function has the advantages of a continuous curve recording even after the transition of the measured value recording from the direct to the indirect recording, and vice versa, since the respective curve section is essentially folded back into the recording field. So, no information is lost in recording. However, for this case of curve recording, the scale is counting backward, but with some practice this will not be considered a disadvantage, if one at all.

With an asymmetric ramp function with corresponding discontinuities, the curve section showing off-scale excursions of the measured values is continued in indirect recording at the respectively opposite recording field limit so that there is no back recording scale, and a specific marking of the off-scale excursion section is not required. However, data can be lost at the discontinuities, if only to a very small degree. The specific marking of the above-mentioned curve sections can be excluded because, due to the discontinuity instructions of initiating and terminating one respective indirect measured value recording, the recording elements can operate only intermittently.

Which one of the two above-mentioned measurements is to be preferred is dependent entirely on the respective objective involved, i.e., on the respective measured and functional value recording with accordingly controlled recording or representation.

If a strictly digital and hybrid technique is employed, a pulse sequence limiter can advantageously be used for applying the method of the invention. This pulse sequence limiter can be realized by a digital computer, represented by a counter control device, or it can consist of an addressable read only memory. Other types of pulse limiters are described in the prior art literature. It will then be necessary either to use a digital measured value recorder together with a digital curve recorder, or to provide an analog-to-digital converter, and/or to connect in series a digital-to-analog converter for supplying the recorded values.

However, a decoding matrix can be advantageously incorporated into the control unit for operating the recording unit whose input is connected to the output of a pulse sequence limiter. Illustratively, such a decoding matrix is used in registration devices as described in German Patent DE-PS No. 1,623,885. Whereas the later case does not require a specific control line for transferring a recording field limiting signal from the pulse limiter to the control device of the display unit, such a control line is advantageously provided between pulse sequence limiter and control device for transferring signals for the marking of indirect measured value recordings. A reliable operation is thus ensured. In an advantageous embodiment of the invention, analog-to-digital converters can be used at the same time as pulse sequence limiters, with analog-to-digital converters being used as described in, e.g., "Taschenbuch der Nachrichtenverarbeitung", second edition, published by K. Steinbuch, in the chapter starting on page 727, "5.8.5. Analog-Digital-Umsetzer fur elektrische GroBen".

Instead of digital and hybrid procedures, it is also possible to employ strictly analog circuit arrangements for carrying out the method of the invention by using a symmetrical or an asymmetrical ramp function. Illustratively, a two-side limiting circuit arrangement as described in the last named book by K. S. Steinbuch on page 1150, FIG. 10.3/54c, can be employed in connection with a symmetrical ramp function. Preferably, it can be employed in the design with zero balancing, as realized by an amplifier with two-side limitation, which in combination with corresponding analog adders supplies the required curve.

In the case of an asymmetrical ramp function, the ramp amplitude is determined by two electronic switching devices which in combination with an amplifier act on an analog adder serving to control the recording procedure. Illustratively, differential amplifiers or current switches known in the prior art literature can be used for that type of switching device.

The respective curve section in direct measured value recording can be marked as by different colors, different dash curve sections, and different dash thicknesses, with the control unit being operated accordingly; for which reference is made to known measures as described, e.g., in German Patent DE-OS No. 2,752,471.

Such marking can also be effected simply by specific recording elements within the area of the recording field limits if, as shown in German Patent DE-OS No. 1,798,042, additional dash markings are made along the recording field margin from the beginning of indirectly measured value recording up to the directly measured value recording. Each specific curve section marking can then be excluded. However, if there are repeated off-scale excursions in one direction, it will be advantageous to ensure a corresponding additional designation for the curves to avoid any possible misinterpretation.

Only one single off-scale excursion at one margin of the recording field is simply recorded if analog circuits are used. If this margin of a recording field is exceeded multiply because of an excess peak, as if multiple off-scale excursions are to be recorded, a corresponding number of analog recording control units have to be arranged in series for such recordings.

Due to the invention, it is now possible to effect a non-supervised registration, e.g., during working breaks, without having to consider at least approximately unexpected circumstances in the form of excessive peaks, with a once-selected scale for curve recording.

Further, through the invention it is now possible to maintain recording precision with very high differences of amplitudes. Therefore, information is not lost. In many cases readjusting of the scale is not necessary, even with a downward trend or an upward trend of curves to be recorded, or if in relatively few cases there is a mean or median value. The invention can also be advantageously applied for making what are termed point patterns.

BRIEF DESCRIPTION OF THE DRAWINGS

The invention will be described in terms of an embodiment with reference to the drawings specified below, in which the drawings show the following.

DETAILED DESCRIPTION OF PREFERRED EMBODIMENTS

Figure 1A:
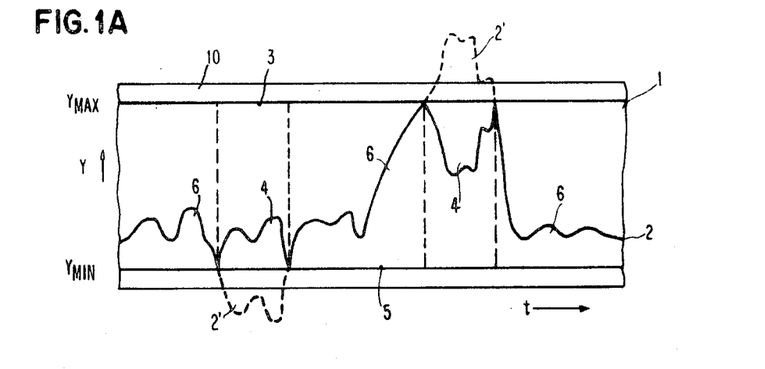
FIG. 1A represents a section of a recording medium with parts of the curve which exceed the recording field being folded back into the recording field for representation of the indirectly measured values.
Figure 1B:
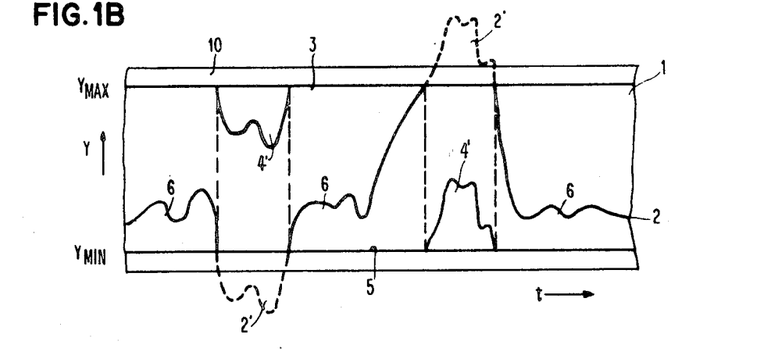
FIG. 1B represents a section of a recording medium with curve sections which exceed the recording field being shifted back into the recording field for recording the indirectly measured values.

Although FIGS. 1A and 1B represent a section of a recording medium, paticularly of a registration strip 10, in this instance, this is only an example. As pointed out above, any other type of recording or representation, particularly also a point pattern, is suitable for the method as disclosed by the invention. Display on an oscilloscope or by an oscillograph is, e.g., equally possible, with the recording medium being replaced by a screen.

A slightly different type of representation is achieved when printing curves by a digital computer, the printer having to be controlled accordingly for the output. The curve to be represented is composed on the printing form of respectively suitable selected characters which are controlled for reproduction in accordance with the respective curve. Various curves or specific curve sections can be differently represented in a relatively simple manner. Either correspondingly different characters are used for curve representation, or interruptions are included in the curve program.

Both FIG. 1A and FIG. 1B show the same details with the same reference numbers. This also applies to FIG. 3A to FIG. 9. The respective recording field 1 of recording media 10 contains a curve 2 whose curve sections 2' represent off-scale excursions at the upper margin 3 as well as at the lower margin 5 of the respective recording field 1.

Through the invention, these off-scale excursions of the measured values are not suppressed in the representation of curves. However, the respective direct measured value recording is now followed by an indirect measured value recording. The respective curve is recorded in the form of curve sections 4 or 4', respectively. Thus, curve 2 is composed of curve sections 6 originating from direct measured value recording by a recording member, respectively, and of curve sections 4 and 4' originating from indirect measured value recording in follow-up or control of the recording members, not considering discontinuities between respective curve section 4' and respective curve sections 6.

For better understanding, it is assumed that these curves represent a function $Y=f(t)$. Then, the upper margin 3 corresponds to a value $Y_{MAX}$ and the lower margin 5 to a value $Y_{MIN}$. FIG. 1A and FIG. 1B show two basic ways of realizing the invention. According to FIG. 1A by simple folding-over, curve recording changes immediately from direct to indirect measured value recording, and vice versa.

In FIG. 1B, curve 2 in recording field 1 is also composed of curve sections 6 directly recorded in response to the measured value, and of curve sections 4' indirectly recorded in response to the measured values. However, curve sections 4' are practically shifted back into recording field 1. At the discontinuities caused here, there appear more or less important interruptions which can affect recording continuity, if only slightly. However, this is compensated by the advantage that this does not include a change of ordinate direction, e.g., a change of reading direction, but merely a scale shift. Because of the intermittent recordings connected therewith, the thus created discontinuities can easily indicate off-scale excursions. Therefore, a specific marking of such off-scale excursions and thus of indirect recordings will frequently be superfluous.

Figure 5:
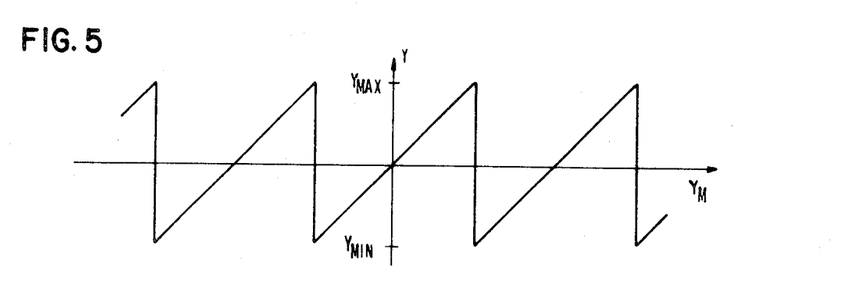
FIG. 5 is a representation of an asymmetrical ramp function for operating the block circuits diagram of FIGS. 3A and 3B.

The program flow chart of FIG. 5 shows the basis of the method as disclosed by the invention. From a sensor representing data source 11, the data in form of measured values $Y_M$ reach a connector 12 which in turn applies values $Y_M$ or Y, respectively to a branch 15. It is determined there whether values $Y_M$ or Y are within recording field 1, or whether they traverse lower margin 5 of recording field 1, i.e., value $Y_{MIN}$, or upper margin 3 of recording field 1 and value $Y_{MAX}$.

If the values are within the recording field 1, measured values $Y_M$ applied to a first operational amplifier 13 are processed together with peak values $Y_{MIN}$ and $Y_{MAX}$ in such a manner that, with curve plotting being continued, the recording is effected from the lower margin 5 corresponding to value $Y_{MIN}$ in accordance with the equation $Y=2\ Y_{MIN}-Y_M$, or after shifting from the upper margin of recording field 1, in accordance with value $Y_{MAX}$, following the equation $Y=Y_M+Y_{MAX}-Y_{MIN}$. If measured values $Y_M$ are so high that upper margin 3 of recording field 1 is traversed, measured values $Y_M$ reach the second operational amplifier 14 from branch 15 to be logically combined with peak values $Y_{MAX}$ and $Y_{MIN}$, depending on whether the realization is according to FIG. 1A or is according to FIG. 1B. For FIG. 1A, this logical relationship depends on equation 2 $Y_{MAX}-Y_M$ in order to guide the curve plotting subsequently in indirect measured value recording from upper margin 3 back into recording field 1, or following equation $Y=Y_M+Y_{MIN}-Y_{MAX}$, to initiate recording in recording field 1 at the lower margin 5, in indirect measured value recording after an off-scale excursion.

The results are again applied to connector 12 to determine at branch 15 that now a transfer to a recording unit representing terminal 16 is possible since value Y is now within recording field 1, or to determine whether to proceed to another logical relationship either in the first operational amplifier 13 or in the second operational amplifier 14 when the respective off-scale excursion of the measured values is higher than twice the recording width.

Measured values are directly transferred from branch 15 to terminal 16 if there is no off-scale excursion so that recording can be continued.

Figure 2:
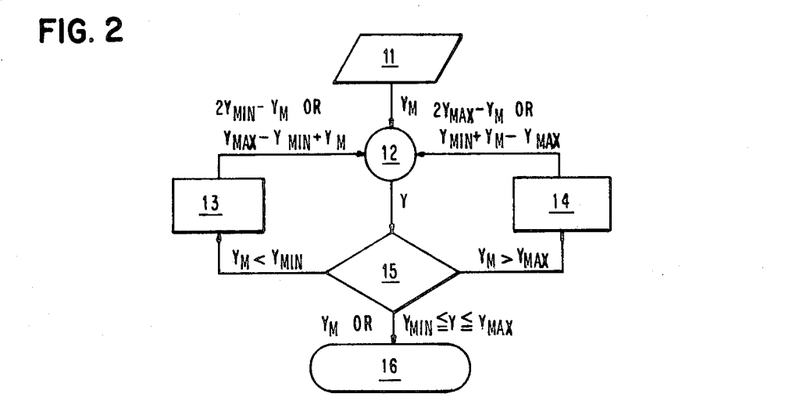
FIG. 2 presents a program flow chart useful for explaining the invention.

The program flow chart according to FIG. 2 shows that by the invention it is possible to record off-scale excursion of measured values which correspond to a multiple of the value of the recording width. In particular, for portable curve plotters, miniature designs can be provided which permit a maximum recording precision.

The method as disclosed by the invention can be executed digitally in a relatively simple manner if the sensor is designed for sending digital values. In that case, the output of the sensor is applied to a pulse sequence follower which is designed in such a manner that only measured values $Y_M$ between the peak values $Y_{MAX}$ and $Y_{MIN}$ are permitted to pass in digital form, whereas measured values higher than $Y_{MAX}$ are subtracted again by the amount by which the peak value is exceeded, before providing values to the recording member. The same applies invertedly for measured values $Y_M$ which are lower than value $Y_{MIN}$ and which, by the respective amount lower than the peak value, are added to value $Y_{MIN}$ before being recorded. In this manner, the invention permits the recording of curves in the recording or representation field 1 without any information being lost. The last-described digital method applies to the recording mode shown in FIG. 1A.

If off-scale excursion in accordance with FIG. 1B is to be recorded, pulse sequence limiter 23 is to be designed in such a manner that, if the respective measured value $Y_M$ falls below peak value $Y_{MIN}$, the digital value corresponding to the recording width is added to this measured value. Whereas, if peak value $Y_{MAX}$ is exceeded, the digital value corresponding to the recording width is subtracted from the respective measured value $Y_M$. In both cases the program flow chart of FIG. 2 is applied. Comparison criteria are always peak values $Y_{MAX}$ and $Y_{MIN}$ predetermined by the recording width.

Pulse sequence follower 23 used in accordance with the invention can be of a design known per se for carrying out the operation described above. However, instead of a specifically designed pulse sequence follower 23, it is equally possible to use a correspondingly programmed digital computer for executing particularly the present problem. Another method consists in using a read-only memory which, upon addressing by the measured values, can present correspondingly associated output values. However, in all cases, the respective pulse sequence limiter 23 used can be designed in such a manner that it also permits the recording of multiple off-scale excursions, for ensuring curve recording in response to measured values $Y_M$. It merely necessitates the repeated consideration of the recording width to follow the program flow chart in accordance with FIG. 2.

For marking the curve sections 4 indirectly recorded in response to measured values $Y_M$ in recording field 1, gates (not shown) are provided in pulse sequence limiter 23. The gates have applied to their one input one respective potential determined by peak values $Y_{MIN}$ and $Y_{MAX}$ to enable the gate, and have applied to their respective other input a potential only when the respectively applied measured value $Y_M$ is higher or lower than the respective peak value $Y_{MIN}$ or $Y_{MAX}$. In response thereto, the respective gate is released and its output is connected via a control line 27 (FIG. 3A) to the control unit 25 of recorder 26.

For digital recording, recording member 26 comprises several recording heads. Those corresponding to peak values $Y_{MAX}$ and $Y_{MIN}$ can easily be energized by signals via control line 27 for a dash marking for the duration of the off-scale excursion. Specific recording heads for colored curve recording can be controlled via a gate control. However, it is equally possible that signals could release the operation of a free-running multivibrator via control line 27 whose output signals are then controlled by an intermittent operation of the recording member or members.

The above described arrangement for carrying out the method as disclosed by the invention is based in a very simple manner on digitally recorded measured values. It is most probable that in practice the sensor is designed for analog operation. In that case, the block circuit diagram of FIG. 3A applies. An analog-to-digital converter 22 arranged in series with sensor 21, is provided whose output controls pulse sequence limiter 23. For pulse sequence limiter 23, there applies what has been specified above, with a digital-to-analog converter 24 having to be provided additionally for analog recording between control unit 25 or recorder 26. Control line 27 is connected directly between pulse sequence limiter 23 and recording control unit 25.

The use of an analog sensor 21 and of an analog recording member 26 permits further simplifications. For example, by suitably designing an analog-to-digital converter, the pulse sequence limitation required for carrying out the method as disclosed by the invention can be effected simultaneously. Suitable circuits for that purpose are given in the above mentioned book "Taschenbuch der Nachrichtenverarbeitung", second edition, by K. Steinbuch on pages 727 ff. After having been modified accordingly, the circuits described there are suitable for the purposes of the invention.

Figure 3A:
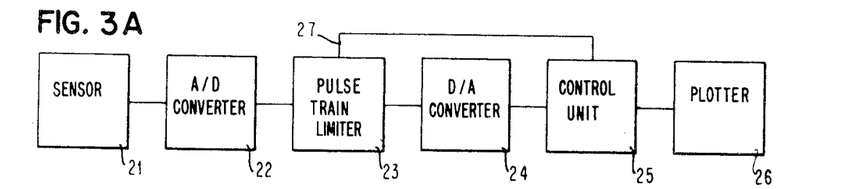
FIG. 3A is a block circuit diagram to apply a hybrid procedure for carrying out the invention.
Figure 3B:
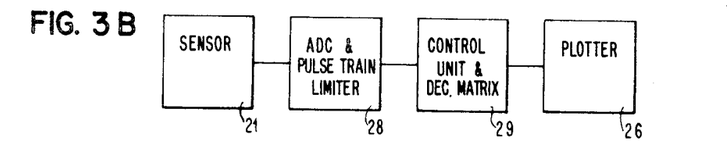
FIG. 3B is a block circuit diagram for a simplified hybrid procedure for carrying out the invention.

Therefore, according to FIG. 3B, an analog-to-digital converter with pulse sequence limiter 28 is arranged in series with sensor 21. However, as pointed out hereinbefore, recording in recording field 1 can also be performed digitally. Accordingly, a control unit with decoding matrix 29 is to be connected in series following pulse sequence limiter 23 or analog-to-digital converter 28 with pulse sequence limitation for correspondingly controlling the recording members. A decoding matrix suitable for that purpose is described in above mentioned German Pat. No. 1,798,042. If the latter switching means are combined, the block circuit diagram of FIG. 3B is obtained wherein a sensor 21 is connected to an analog-to-digital converter 28, with pulse sequence limitation, whose output is connected to the input of a control device with decoding matrix 29, for controlling the digital recording member 26.

Apart from the digital and hybrid curve recording methods described above, the method as disclosed by the inention can also be implemented by a strictly analog process. Here, too, curve recording can be performed in accordance with FIG. 1A or FIG. 1B. For the recording method according to FIG. 1A, sensor 21 is connected both to the input of a two-sided clipper 31 and to an inverter 32, the outputs of both units 31 and 32 being applied to corresponding inputs of a first analog adder 33, whose output is applied to a first input of a second analog adder 34. The second analog adder 34 is applied to the input of control device 35 whose output is connected to recording member 26.

Two-sided clipper 31 can be a diode quad circuitry in the manner of a bridge rectifier whose one bridge diagonal, connected to homologous diode electrodes, is applied via controllable resistors to a voltage source, and whose other diagonal, connected to non-homologous diode electrodes, forms the input and the output of this clipper. Circuits of this type are known per se, too, as indicated on page 1150 of the above mentioned book by K. Steinbuch.

However, such a passive limiter may require the use of an additional amplifier. In this case, the use of a two-sided clipping amplifier will be resonable, if required. For control by peak values $Y_{MAX}$ and $Y_{MIN}$, the signal between input and output of the two-sided clipper 31 can be used which, in case of off-scale excursions, either operates an indicator lamp, or, via a connection to control device 35 (not shown), controls the marking of the off-scale excursions, i.e., the indirect measured value recording by recording member 26. In this instance, specific recording members or, if only one recording member is used, also the respective recording operation can be set in a manner known per se.

Figure 4:
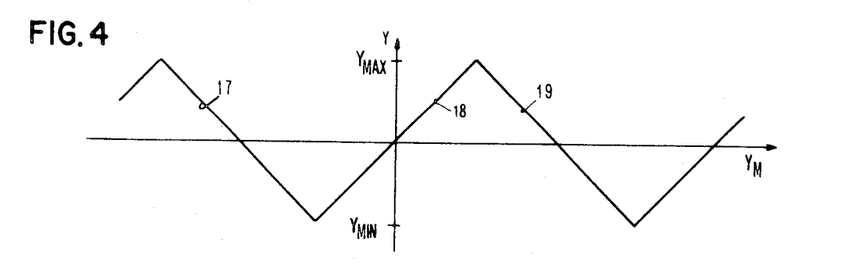
FIG. 4 is a representation of a symmetrical ramp function for the operation of the block circuit diagram of FIGS. 3A and 3B.
Figure 6:
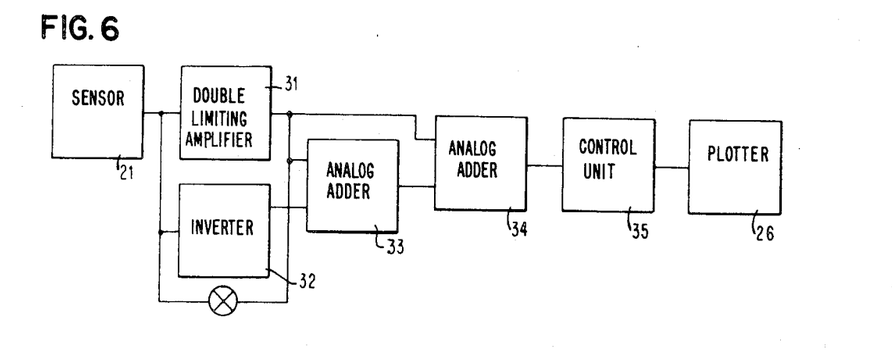
FIG. 6 is a block circuit diagram for carrying out the invention with an analog circuit which utilizes a symmetrical ramp function.
Figure 7:
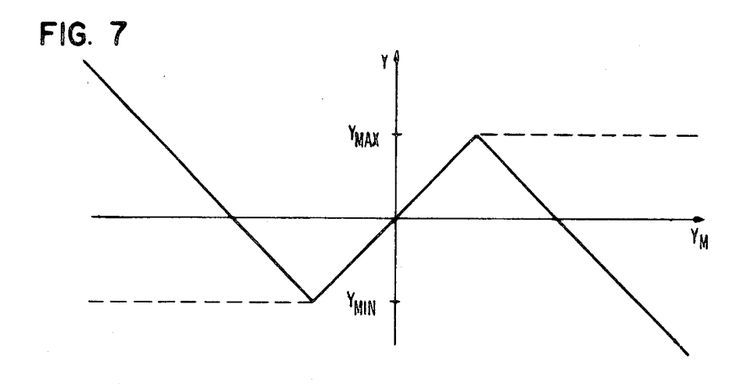
FIG. 7 is a representation of a symmetrical ramp function for operating the circuit arrangement of FIG. 6.

The function of the recorded measured values Y, dependent on the transmitted measured values $Y_M$, for the arrangement according to FIG. 6, can be derived from the graphic representation according to FIG. 7, wherein the recording field is defined by peak values $Y_{MAX}$ and $Y_{MIN}$. By the arrangement according to FIG. 6, for carrying out the method as disclosed by the invention, it is possible, apart from direct measured value recording, to record measured values which exceed at most the recording field by one recording width, and which are below the recording field up to one recording width. Additionally, if multiple off-scale excursions are to be considered, a corresponding number of stages shown in FIG. 6 have to be arranged in series, so that a graphic representation according to FIG. 4 is obtained. Recorded values Y are again shown in FIG. 4 as a function of measured values $Y_M$. Therefore, in a corresponding number of stages according to FIG. 6, there is a symmetrical ramp oscillation with falling period sections 17 and 19 and rising period section 18. The graphic representation according to FIG. 4 can be used analogously for the digital processes shown in connection with FIG. 3A and 3B. Both graphs according to FIG. 7 and FIG. 4 clearly show that, in case of off-scale excursions, the measured values have to be counted from the respective margin downward in a reversed ordinate direction, since starting with the margin, recording is now effected in a reversed sense.

Figure 8:
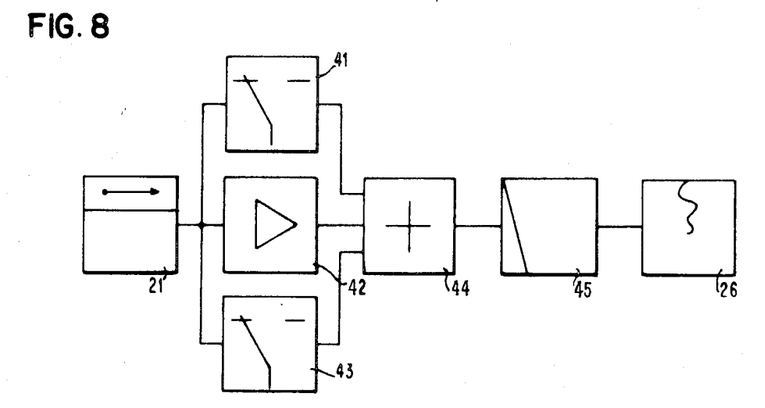
FIG. 8 is an analog block circuit diagram for carrying out the invention with an asymmetrical ramp function.

Analogously, for carrying out the method of FIG. 1B, an arrangement is used as shown by the block circuit diagram of FIG. 8. Sensor 21 is connected with its output to an input of an amplifier 42 and to the inputs of one respective electronic threshold switching device 41 and 43, which, when threshold values are exceeded by measured values $Y_M$, suddenly reduce the output potential by an amount corresponding to the recording width of recording field 1. Illustratively, threshold switching devices of this type can be differential amplifiers and current switches, the respective reference value being represented by the respective peak value $Y_{MAX}$ and $Y_{MIN}$. The threshold values of electronic threshold switching devices 41 and 43 are applied to the inputs of an analog adder 44 whose output is connected to the input of a control device 45 controlling recorder 26. Control device 45 also derives from the output signals of analog adder 44 corresponding control signals for marking curve sections in off-scale excursion, i.e., indirect measured value recordings.

Similarly to the amplifier used in connection with the two-sided clipping according to FIG. 6, amplifier 44 advantageously operates linearly, at least in the area of the recording field, to ensure a linear dependence of the recorded measured values on the arriving measured values $Y_M$. However, for predetermined purposes, non-linear functions or operations, as, e.g., logarithmic ones, can be given in amplitude limiting or pulse sequence limiting for permitting the simple execution of specific tasks, particularly when the method as disclosed by the invention is applied in analog computers. The method as disclosed by the invention offers advantages both in the curve plotting of measured values and for the output units of analog computers.

Figure 9:
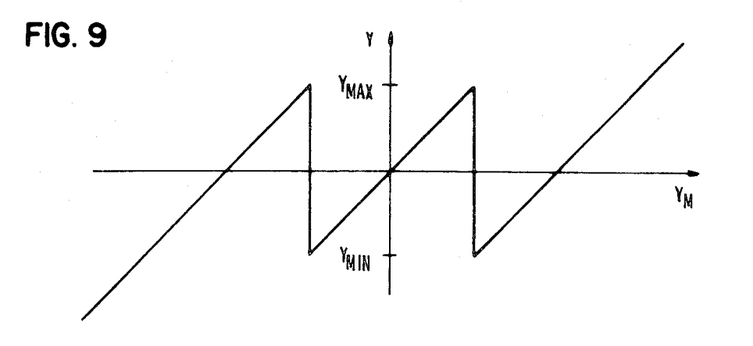
FIG. 9 is a representation of an asymmetrical ramp function for operating the circuit arrangement of FIG. 8.

With reference to the arrangement of FIG. 8, if only one stage is used, measured value recording according to the representation of FIG. 9 is obtained where the recorded measured values Y are also recorded as a function of the arriving method values $Y_M$. The recording width is also predetermined by peak values $Y_{MAX}$ and $Y_{MIN}$. With a precise curve recording, the use of such a stage leads to a triple recording field without any negative effect of the off-scale excursion. However, values exceeding this limit can no longer be recorded.

If multiple off-scale excursions are to be considered, a corresponding number of stages of the circuit arrangement of FIG. 8 have to be used. Accordingly, an asymmetrical ramp function as in the representation of FIG. 5 is obtained for the measured value recording. Although the recorded measured values Y are again plotted as a function of the arriving measured values $Y_M$, the ramp period corresponds to substantially the recording width between peak values $Y_{MAX}$ and $Y_{MIN}$. The respective discontinuity in the ramp function is determined by the operating speed of threshold switching devices 41 and 43, which is practically negligible considering present-day technology, e.g., current switches. The asymmetrical ramp curve according to FIG. 5 theoretically can be used without limitation if digital procedures with arrangements in accordance with FIGS. 3A and 3B are used. However, for analog procedures, a corresponding number of stages has to be provided as specified above.

For marking tracks in predetermined curve sections of recording field 1, procedures and steps can be applied as indicated in U.S. Pat. No. 3,042,922, wherein the respective length of the dashes formed is used for marking. However, in a modified version, the interruptions with the simultaneous recording of peak values $Y_{MIN}$ and $Y_{MAX}$ are controlled within the margins of recording field 1.

ASPECTS OF THE INVENTION

Aspect 1 of the invention comprises method and arrangement for controlling a recorder (26) by means of a recording control unit (e.g., 23) in response to measured values ($Y_M$) to be recorded in curve form in a recording field (1) of a recording medium (10), recording elements being energized for marking purposes by off-scale excursions of the measured values ($Y_M$), on the basis of comparison results ($Y_{MIN} > Y_M > Y_{MAX}$) of the respective measured values ($Y_M$) with reference values ($Y_{MIN}$, $Y_{MAX}$) predetermined by the upper and lower margins of the recording field (1), characterized in that, apart from direct measured value recording known per se for detecting measured values ($Y_{MIN} < Y_M < Y_{MAX}$) within the recording field (1), the recording control unit (23), upon indirect recording for detecting measured values ($Y_{MIN} > Y_M > Y_{MAX}$) existing per se outside the recording field (1), energizes recording elements effective within the recording field (1) for continuing the curve recording with simultaneous marking by means of specific recording element control of the respective curve section (2') extending per se outside the recording field (1).

Aspect 2 of the invention comprises method and arrangement as described in aspect 1, characterized in that the recording control unit (23) provides a ramp function of the measured values to be recorded in curve form (2) of the detected measured values ($Y_M$) and in that the ramp amplitude determines the margin conditions defined by the reference values ($Y_{MIN}$, $Y_{MAX}$) so that a ramp section (18) with direct measured value recording has at least one associated ramp section (17 or 19) for the indirect measured value recording.

Aspect 3 of the invention comprises method and arrangement as described in aspect 2, characterized in that if a ramp (e.g., FIG. 4) symmetrical with respect to rise and fall is used, the ramp sections (17, 18 and 19) are equal and correspond each to one semi-period, and in that, in connection with an asymmetrical ramp (e.g., FIG. 5), the ramp sections substantially correspond approximately to one respective period.

Aspect 4 of the invention comprises method and arrangement for carrying out aspects 1 to 3, characterized in that a sensor (21) has an associated analog-to-digital converter (22) connected to a pulse sequence limiter (23) serving as a recording control unit and responding to the margin conditions for the transition from direct to indirect measured value recording, or vice versa, for limiting the number of providable pulses to a value corresponding to the recording width of the recording field (1), and in that the output of the pulse sequence follower (23) is coupled to a control unit (e.g., 25) of the recorder (26).

Aspect 5 of the invention comprises method and arrangement as described in aspect 4, characterized in that for processing digital measured values, the sensor (21) is directly connected to the pulse sequence follower.

Aspect 6 of the invention comprises method and arrangement as described in aspects 4 and 5, characterized in that, for using a symmetrical ramp (FIG. 4), the pulse sequence follower (23) is equipped with a device for pulse transposition reversal to be released upon the margin conditions becoming effective.

Aspect 7 of the invention comprises method and arrangement as described in aspects 4 and 5, characterized in that, for utilizing the asymmetrical ramp (FIG. 5), the pulse sequence follower (23) is equipped with a device for resetting the pulse transposition process from the margin conditions becoming effective.

Aspect 8 of the invention comprises method and arrangement as described in aspects 4 to 7, characterized in that a digital-to-analog converter (24) is provided between pulse sequence limiter (23) and control device (25) of the recorder (26).

Aspect 9 of the invention comprises method and arrangement as described in aspects 4 to 7, characterized in that the recorder (26) is connected to a decoding matrix in the control device (29), and the input of the decoding matrix is connected to the output of the pulse sequence limiter (23).

Aspect 10 of the invention comprises method and arrangement as described in aspects 8 or 9, characterized in that a control line (27) is provided between pulse sequence limiter (23) and control device (25) of the recorder (26) for transfering signals for the marking of indirect measured value recordings.

Aspect 11 of the invention comprises method and arrangement as described in aspects 4 and 7 to 10, characterized in that an analog-to-digital converter additionally contains means for pulse sequence limiting (FIG. 3B).

Aspect 12 of the invention comprises method and arrangement for carrying out the method and arrangement as described in aspects 1 to 3, characterized in that, for applying the symmetrical ramp (FIG. 7) for releasing the transition from indirect to direct measured value recording, or vice versa, the output of the sensor (21) is applied to the inputs of a two-sided clipper (31) defining the recording width of the recording field (1) and of an inverter (32), and in that the outputs of the clipper (31) and of the inverter (32) are connected to the inputs of a first analog adder (33), and in that the outputs of the two-sided clipper (31) and of the first analog adder (33) are connected to the inputs of a second analog adder (34), the output of which is connected to the control device (35) of the recorder (26).

Aspect 13 of the invention comprises method and arrangement for carrying out aspects 1 to 3, characterized in that, for utilizing the asymmetrical ramp function (FIG. 9) for releasing the transition from the direct to the indirect measured value recording, or vice versa, the output of the sensor (21) is connected to the input of an amplifier (42) as well as to the inputs of one respective switching device (41, 43) to respond to a threshold value ($Y_{MIN}$ or $Y_{MAX}$) reached by the respective measured value ($Y_M$) and corresponding to a margin (3 or 5) of the recording field (1), and in that the outputs of the amplifier (42) and of the switching devices (41, 43) are applied to the inputs of an analog adder (44), whose output is connected to the control device (25) connected to the recorder (26).

Aspect 14 of the invention comprises method and arrangement as described in aspect 12, characterized in that the input together with the output of the two-sided clipper (31) serves as a source for the control signal to mark indirect measured value recordings.

Aspect 15 of the invention comprises method and arrangement as described in aspect 13, characterized in that the respective output of the switching devices (41, 43) together with the input of the amplifier (42) serves as a source for the control signal to mark indirect measured value recordings.

Having thus described my invention, what I claim as new, and desire to secure by Letters Patent is:

1. An apparatus for controlling a recorder in response to measured values ($Y_M$) to be recorded in curve form in a recording field of a recording medium, comprising:

recording elements means being energized for marking purposes by on scale and off-scale excursions of the measured values ($Y_M$), on the basis of comparison results ($Y_{MIN} < Y_M < Y_{MAX}$) and ($Y_{MIN} > Y_M > Y_{MAX}$) respectively of the respective measured values ($Y_M$) with reference values ($Y_{MIN}$ and $Y_{MAX}$) predetermined by the upper and lower margins of the recording filed; and a recording control unit means including:

means for providing a ramp function of the measured values to be recorded in curve form of the detected measured values ($Y_M$), in which the ramp amplitude determines the margin conditions defined by the reference values ($Y_{MIN}$ and $Y_{MAX}$), one ramp section of said ramp function, with the direct measured value recording, having at least one associated ramp section for the indirect measured value recording, said ramp function is symmetrical with respect to rise and fall and the sequential ramp sections are equal and each correspond to one semi-period;

means for applying the symmetrical ramp function for releasing the transition from indirect to direct measured value recording, or vice versa, having a two-sided clipper defining the recording width of the recording field, an inverter, a sensor which is applied to the inputs of said clipper and said inverter, a first analog adder and a second analog adder, the outputs of the clipper and of the inverter are connected to the inputs of said first analog adder, and the outputs of the two-sided clipper and of the first analog adder are connected to the inputs of said second analog adder, a control device to which is connected the output of the second analog adder, and said control device is connected to said recording element means;

said recording control unit means, upon direct recording for detecting measured values ($Y_{MIN} < Y_M < Y_{MAX}$) existing inside the recording field, energizes said recording elements effective within the recording field for continuing the curve recording with simultaneous marking by specific recording element control of the respective curve section extending inside the recording field; and said recording control unit, upon indirect recording for detecting measured values ($Y_{MIN} > Y_M > Y_{MAX}$) existing outside the recording field, energizes said recording elements effective within the recording field for continuing the curve recording with simultaneous marking by specific recording element control of the respective curve section extending outside the recording field.

2. Apparatus as set forth in claim 1, wherein the input and the output of the two-sided clipper serve as a source for the control signal to mark indirect measured value recordings.

3. An apparatus for controlling a recorder in response to measured values ($Y_M$) to be recorded in a curve form in a recording field of a recording medium, comprising:

recording elements means being energized for marking purposes by on scale and off-scale excursions of the measured values ($Y_M$), on the basis of comparison results ($Y_{MIN} < Y_M < Y_{MAX}$) and ($Y_{MIN} > Y_M > Y_{MAX}$) respectively of the respective measured values ($Y_M$) with reference values ($Y_{MIN}$ and $Y_{MAX}$) predetermined by the upper and lower margins of the recording filed; and a recording control unit means including:

means for providing a ramp function of the measured values to be recorded in curve form of the detected measured values ($Y_M$), in which the ramp amplitude determines the margin conditions defined by the reference values ($Y_{MIN}$ and $Y_{MAX}$), one ramp section of said ramp function, with the direct measured value recording, having at least one associated ramp section for the indirect measured value recording, said ramp function is asymmetrical and the ramp sections substantially correspond to one respective period approximately; and means for utilizing the asymmetrical ramp function for releasing the transition from the direct to the indirect measured value recording, or vice versa, having a sensor, an amplifier, first and second switching devices, the output of the sensor being connected to the input of the amplifier and to the inputs of one of said switching devices, to respond to a threshold value ($Y_{MIN}$ or $Y_{MAX}$) reached by the respective measured value ($Y_M$) and corresponding to a margin of the recording field, an analog adder, the outputs of the amplifier and of the switching devices being applied to the inputs of said analog adder, a control device which is connected to the output of said analog adder, and said control device is connected to said recording element means;

said recording control unit means, upon direct recording for detecting measured values ($Y_{MIN} < Y_M < Y_{MAX}$) existing inside the recording field, energizes said recording elements effective within the recording field for continuing the curve recording with simultaneous marking by specific recording element control of the respective curve section extending inside the recording field; and said recording control unit, upon indirect recording for detecting measured values ($Y_{MIN} > Y_M > Y_{MAX}$) existing outside the recording field, energizes said recording elements effective within the recording field for continuing the curve recording with simultaneous marking by specific recording element control of the respective curve section extending outside the recording field.

4. Apparatus as set forth in claim 3 wherein the respective output of the switching devices together with the input of the amplifier serve as a source for the control signal to mark in direct measured value recordings.

5. An apparatus for controlling a recorder in response to measured values ($Y_M$) to be recorded in curve form in a recording field of a recording medium, comprising:

recording elements means being energized for marking purposes by on scale and off-scale excursions of the measured values ($Y_M$), on the basis of comparison results ($Y_{MIN} < Y_M < Y_{MAX}$) and ($Y_{MIN} > Y_M > Y_{MAX}$) respectively of the respective measured values ($Y_M$) with reference values ($Y_{MIN}$ and $Y_{MAX}$) predetermined by the upper and lower margins of the recording filed; and a recording control unit means including a sensor, an analog-to-digital converter coupled to said sensor, a pulse sequence limiter coupled to said analog-to-digital converter responding to the margin conditions for the transition from direct to indirect measured value recording, or vice versa, for limiting the number of providable pulses to a value corresponding to the recording width of the recording field, a control unit coupled to the output of said pulse sequence limiter, and said control device is connected to said recording element means;

said recording control unit means, upon direct recording for detecting measured values ($Y_{MIN} < Y_M < Y_{MAX}$) existing inside the recording field, energizes said recording elements effective within the recording field for continuing the curve recording with simultaneous marking by specific recording element control of the respective curve section extending inside the recording field; and said recording control unit, upon indirect recording for detecting measured values ($Y_{MIN} > Y_M > Y_{MAX}$) existing outside the recording field, energizes said recording effective within the recording field for continuing the curve recording with simultaneous marking by specific recording element control of the respective curve section extending outside the recording field.

6. Apparatus in claim 5, wherein the sensor is directly connected to a pulse sequence follower for processing digital measured values.

7. Apparatus as set forth in claim 5 wherein, for using a symmetrical ramp function, the pulse sequence limiter includes a device means for pulse transposition reversal to be released upon the margin conditions becoming effective.

8. Arrangement as set forth in claim 5 wherein, for utilizing the asymmetrical ramp function, pulse sequence limiter includes a device means for resetting the pulse transposition procedure from the margin conditions becoming effective.

9. Apparatus as set forth in claim 5 wherein, a digital-to-analog converter is provided between the pulse sequence limiter and the control unit.

10. Apparatus as set forth in claim 5 wherein, the recorder is connected to a decoding matrix in the control unit, and the input of the decoding matrix is connected to the output of the pulse sequence limiter.

11. Apparatus as set forth in claim 9 wherein, a control line is provided between the pulse sequence limiter and the control unit for transfering signals for the marking of indirect measured value recordings.

12. Apparatus as set forth in claim 10, wherein a control line is provided between the pulse sequence limiter and the control unit for transfering signals for the marking of indirect measured value recordings.

13. Apparatus as set forth in claim 10, wherein said analog-to-digital converter additionally contains pulse sequence limiting means.

* * * * *